(12) United States Patent
Kim et al.

(10) Patent No.: US 7,848,437 B2
(45) Date of Patent: Dec. 7, 2010

(54) SUB-CARRIER DIVERSITY METHOD ON MULTI-BAND ORTHOGONAL-FREQUENCY-DIVISION-MULTIPLEXING SYMBOL

(75) Inventors: Hae-sik Kim, Suwon-si (KR); Jae-ho Roh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 701 days.

(21) Appl. No.: 11/641,075

(22) Filed: Dec. 19, 2006

(65) Prior Publication Data

US 2007/0147526 A1 Jun. 28, 2007

(30) Foreign Application Priority Data

Dec. 27, 2005 (KR) .............................. 2005-130800

(51) Int. Cl.
*H04K 1/10* (2006.01)
(52) U.S. Cl. ...................................... 375/260; 375/259
(58) Field of Classification Search ................ 375/260, 375/259; 455/59; 370/69.1
See application file for complete search history.

(56) References Cited

U.S. PATENT DOCUMENTS

| 7,366,262 | B2 * | 4/2008 | Shin et al. ................... 375/344 |
| 7,376,117 | B2 * | 5/2008 | Erlich et al. ................ 370/343 |
| 7,535,819 | B1 * | 5/2009 | Larsson et al. ............. 370/208 |
| 2004/0190640 | A1 * | 9/2004 | Dubuc et al. ................ 375/260 |
| 2007/0030796 | A1 * | 2/2007 | Green ........................ 370/208 |
| 2009/0252241 | A1 * | 10/2009 | Larsson et al. ............. 375/260 |

* cited by examiner

*Primary Examiner*—Shuwang Liu
*Assistant Examiner*—Helene Tayong
(74) *Attorney, Agent, or Firm*—NSIP Law (57) ABSTRACT

A sub-carrier diversity method on an MB-OFDM (multi-band orthogonal-frequency-division-multiplexing) system repeatedly transmitting an identical frequency band of an identical symbol, including: setting a value of a TDS (time domain spreading) of sub-carriers depending on a transmission rate; and shifting the positions of the sub-carriers in a predetermined unit so that the sub-carriers diverge from one band to another.

12 Claims, 8 Drawing Sheets

SUB-CARRIER DIVERSITY METHOD ON MULTI-BAND ORTHOGONAL-FREQUENCY-DIVISION-MULTIPLEXING SYMBOL

CROSS-REFERENCE TO RELATED APPLICATION

This application claims the benefit of Korean Patent Application No. 2005-130800 filed Dec. 27, 2005, in the Korean Intellectual Property Office, the disclosure of which is incorporated herein by reference.

BACKGROUND OF THE INVENTION

1. Field of the Invention

An aspect of the present invention relates to a sub-carrier diversity method on a multi-band (MB)-orthogonal-frequency-division-multiplexing (OFDM) symbol, and more particularly, to a sub-carrier diversity method on an MB-OFDM symbol by which a time domain spreading (TDS) is set with respect to sub-carriers according to a frequency hopping pattern and positions of the sub-carriers are shifted in a predetermined unit within each time domain so as to allow the sub-carriers to diverge in an MB-OFDM system in which an identical frequency band of an identical symbol is repeated.

2. Description of the Related Art

In general, OFDM systems transform symbols input in series into parallel symbols having predetermined sizes, multiplex the parallel symbols into orthogonal different sub-carrier frequencies, and transmit the orthogonal different sub-carrier frequencies.

In an MB-OFDM method, a plurality of frequency bands of an OFDM symbol in the unit of symbol hop in order to transmit a signal. For example, the MB-OFDM method is a modulation technology used in a specific wireless communication system such as an ultra wide band (UWB) system. OFDM modulation technology and frequency hopping technology are combined into MB-OFDM modulation technology.

An MB-OFDM system divides a predetermined frequency band into a plurality of sub-bands. The MB-OFDM system can transmit data (a symbol) using the plurality of sub-bands so as to transmit or receive a large amount of data per unit time. A UWB system selects one of the pluralities of sub-bands and uses the selected sub-band according to set regulations so as to improve security of data.

[Table 1] below shows a method of transmitting payloads according to a transmission rate in the MB-OFDM system.

TABLE 1

| Transmission Rate | Modulation Method | Encoding Rate | Conjugate | TSF | Spreading Gain |
|---|---|---|---|---|---|
| 53.3 | QPSK | 1/3 | o | 2 | 4 |
| 80 | QPSK | 1/2 | o | 2 | 4 |
| 106.67 | QPSK | 1/3 | x | 2 | 2 |
| 160 | QPSK | 1/2 | x | 2 | 2 |
| 200 | QPSK | 5/8 | x | 2 | 2 |
| 320 | DCM | 1/2 | x | 1 | 1 |
| 400 | DCM | 5/8 | x | 1 | 1 |
| 480 | DCM | 3/4 | x | 1 | 1 |

In a case where the transmission rate is between 53.3 Mbps and 200 Mbps, the MB-OFDM system uses a quadrature phase shift keying (QPSK) method. In a case where the transmission rate is between 320 Mbps and 480 Mbps, the MB-OFDM system uses a dual carrier modulation (DCM) method.

In a case where the transmission rate is between 53.3 Mbps and 80 Mbps, the MB-OFDM system transmits a conjugate symbol. Thus, the spreading gain is "4." In other words, in a case where the transmission rate is between 53.3 Mbps and 80 Mbps, a time spreading factor (TSF) is "2." Thus, one symbol is transmitted four times, including conjugate symbols.

[Table 2] below shows an example of transmitting a symbol in an MB-OFDM system having a transmission rate between 53.3 Mbps and 80 Mbps.

TABLE 2

| Data | Mapping Data |
|---|---|
| D0 | C0 |
| D1 | C1 |
| ... | ... |
| D49 | C49 |
| D49* | C50 |
| ... | ... |
| D1* | C98 |
| D0* | C99 |

Referring to Table 2, one piece of data is transmitted two times, including conjugate data. In other words, a transmitter transmits data D0 through D49 together with conjugate data D0* through D49*. Also, if the QPSK method is used, the transmitter divides one piece of data into real and imaginary components and transmits the real and imaginary components.

Figure 1:
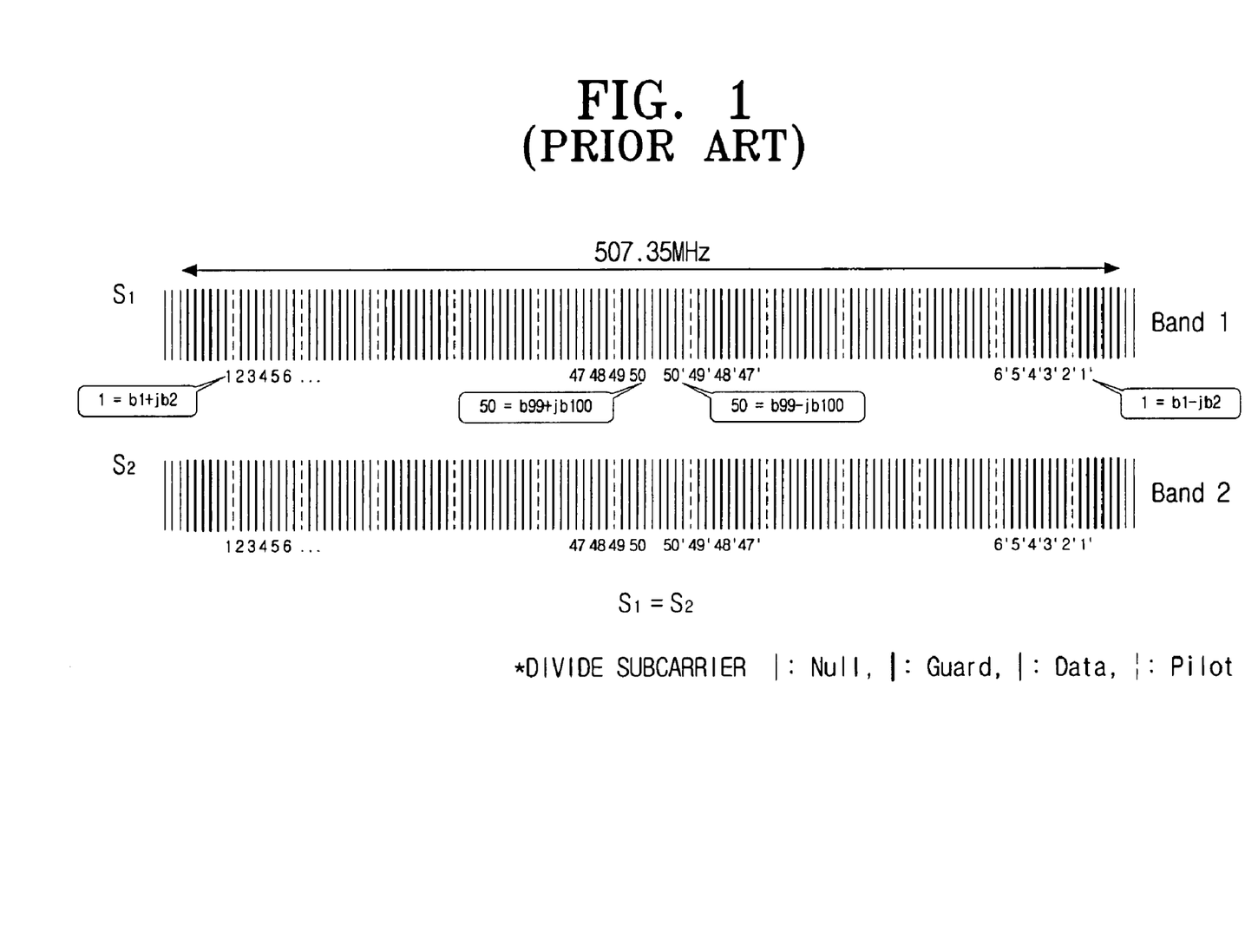
FIG. 1 is a view illustrating frequency bands of sub-carriers having a TDS of "2" according to the prior art.

In a case where a data transmission rate is between 53.3 Mbps and 200 Mbps in an MB-OFDM-based UWB system as described above, a value of a TDS is "2" as shown in FIG. 1. Thus, the MB-OFDM-based UWB system transmits a frequency band of a sub-carrier including a symbol and a conjugate symbol only two times. As a result, in a case where errors occur in transmitted frequency bands Band1 and Band2, a bit error rate (BER) is increased.

SUMMARY OF THE INVENTION

Accordingly, the present general inventive concept has been made to solve the above-mentioned and/or other problems, and an aspect of the present general inventive concept is to provide a sub-carrier diversity method on an MB-OFDM symbol by which a TDS is set with respect to sub-carriers according to a frequency hopping pattern, and positions of the sub-carriers are shifted in a predetermined unit within each time domain so as to allow the sub-carriers to diverge in an MB-OFDM system in which an identical frequency band of an identical symbol is repeated.

According to an aspect of the present invention, there is provided a sub-carrier diversity method on an MB-OFDM (multi-band orthogonal-frequency-division-multiplexing) system repeatedly transmitting an identical frequency band of an identical symbol, including setting a value of a TDS (time domain spreading) of sub-carriers depending on a transmission rate and shifting positions of the sub-carriers in a predetermined unit so that the sub-carriers diverge.

According to another aspect of the present invention, if the value of the TDS is set to 2 or a multiple of 2, the sub-carriers may be cyclically shifted in a predetermined unit in a frequency band transmitted at each stage so as to diverge.

According to another aspect of the present invention, if the value of the TDS is "4," the sub-carriers may diverge in a unit of 50 in frequency bands transmitted at first through third stages and be cyclically shifted in a unit of 25 so as to diverge in a frequency band transmitted at a fourth stage.

According to another aspect of the present invention, 25 sub-carriers from 26 to 50 may be shifted to positions of 25 sub-carriers from 1 to 25 so as to diverge in the frequency band transmitted at the fourth stage S4, and 25 sub-carriers from 25' to 1' may be shifted to positions of 25 sub-carriers from 50' to 26' so as to diverge in a symmetric frequency band.

According to another aspect of the present invention, if the value of the TDS is set to 2 or a multiple of 2, the sub-carriers may be reversed in a predetermined unit so as to diverge in a frequency band transmitted at each stage.

According to another aspect of the present invention, if the value of the TDS is "4," the sub-carriers may diverge in a unit of 50 in frequency bands transmitted at first through third stages and in a reverse order in a unit of 50 in a frequency band transmitted at a fourth stage.

According to another aspect of the present invention, sub-carriers in a reverse order from 50 to 1 may diverge in the frequency band transmitted at the fourth stage and sub-carriers in a reverse order from 1' to 50' may diverge in a symmetric frequency band.

According to another aspect of the present invention, if the value of the TDS is "3," 50 sub-carriers and 50 symmetric sub-carriers may diverge in a frequency band transmitted at each stage.

According to another aspect of the present invention, if the value of the TDS is set to 2 or a multiple of 2, sub-carriers cyclically shifted in a predetermined unit and sub-carriers reversed in a predetermined unit may diverge in the frequency band transmitted at each stage.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent, and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
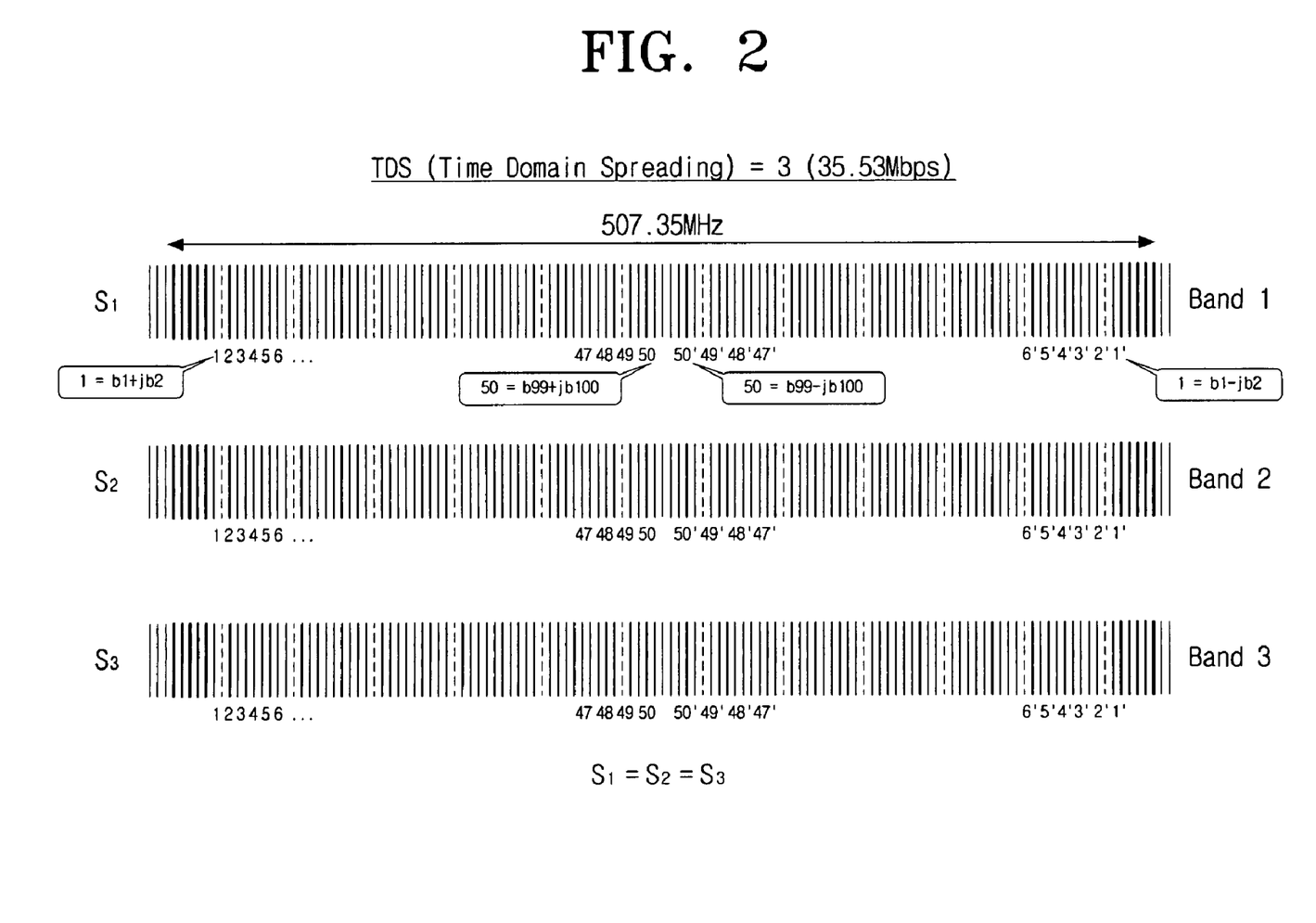
FIG. 2 is a view illustrating frequency bands having a TDS value of "3" in a sub-carrier diversity method on an MB-OFDM symbol according to an embodiment of the present invention.

FIG. 2 is a view illustrating frequency bands having a TDS value of "3" in a sub-carrier diversity method on an MB-OFDM symbol according to an embodiment of the present invention.

As shown in FIG. 2, a TDS of a sub-carrier is set depending on a transmission rate. If the transmission rate is 35.53 Mbps, a value of the TDS is "3." Here, a used frequency band of a transmitted symbol is 507.35 MHz. In other words, the frequency band of 507.35 MHz is transmitted three times. Referring to FIG. 2, a first frequency band Band1 is transmitted at a first stage S1, a second frequency band Band 2 is transmitted at a second stage S2, and a third frequency band Band 3 is transmitted at a third stage S3.

Also, positions of sub-carriers are shifted in a predetermined unit so that sub-carriers diverge from each frequency band. In other words, 50 symbols from 1 to 50 and 50 symmetric symbols from 50' to 1' diverge in the first frequency band Band 1. Here, one symbol includes conjugate symbols such as "1=b1+jb2" and "50=b99+jb100." Asymmetric symbol also includes conjugate symbols such as "50=b99−jb100" and "1=b1−jb2."

The frequency band Band 2 transmitted at the second stage S2 has the same structure as the first frequency band Band 1, and thus 50 symbols diverge from a sub-carrier in the second frequency band Band 2.

The third frequency band Band 3 transmitted at the third stage S3 has the same structure as the first and second frequency bands Band 1 and Band 2, and thus 50 symbols diverge from a sub-carrier in the third frequency band Band 3.

Figure 3:
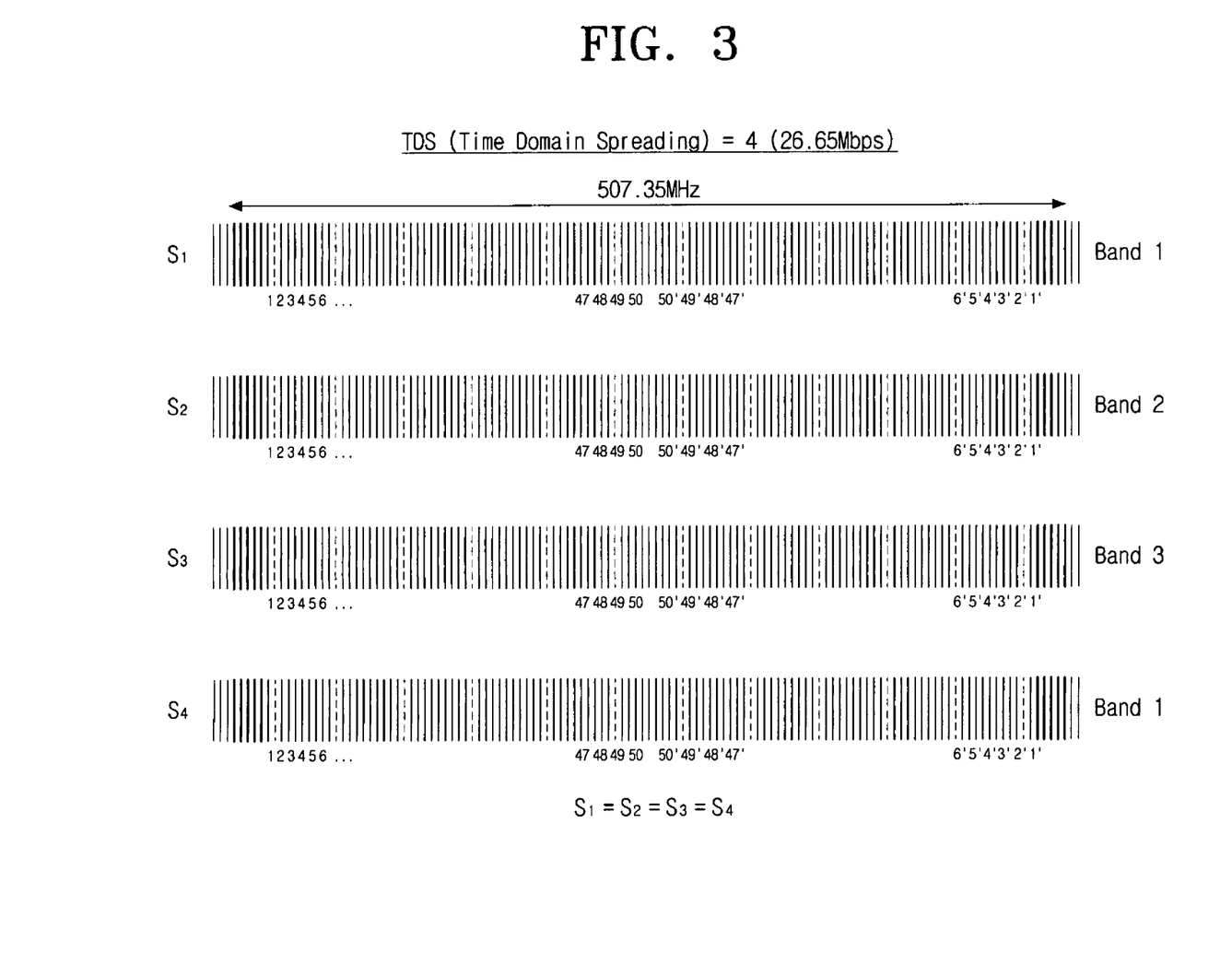
FIG. 3 is a view illustrating frequency bands having a TDS value of "4" in a sub-carrier diversity method on an MB-OFDM symbol according to an embodiment of the present invention.

FIG. 3 is a view illustrating frequency bands having a TDS value of "4" in a sub-carrier diversity method on an MB-OFDM symbol according to an embodiment of the present invention.

Referring to FIG. 3, when a used frequency band is 507.35 MHz like the used frequency band shown in FIG. 2 and a transmission rate is 26.65 Mbps, a value of a TDS is set to "4." Thus, a frequency band to be transmitted is transmitted four times from a first stage S1 through a fourth stage S4.

To transmit each frequency band, positions of sub-carriers are shifted in a predetermined unit in each frequency band so that the sub-carriers diverge in each frequency band and then the sub-carriers are transmitted. In other words, 50 symbols from 1 to 50 and 50 symmetric symbols from 50' to 1' diverge in a first frequency band Band 1 transmitted at a first stage S1.

50 symbols and 50 symmetric symbols diverge from a sub-carrier in a second frequency band Band 2 transmitted at a second stage S2.

50 symbols and 50 symmetric symbols diverge from a sub-carrier in each of third and fourth frequency bands Band 3 and Band 4 respectively transmitted at third and fourth stages S3 and S4.

Thus, the first, second, third, and fourth frequency bands Band 1, Band 2, Band 3, and Band 4 have the same diversity structure (S1=S2=S3=S4).

Figure 4:
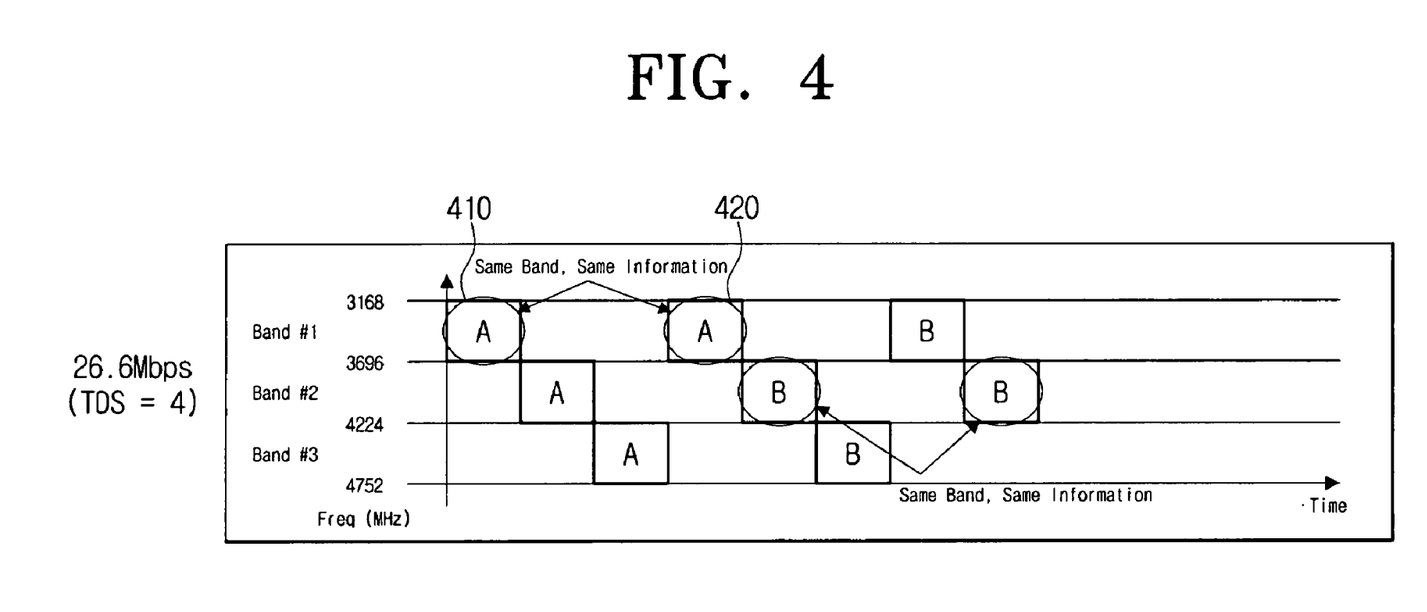
FIG. 4 is a view illustrating disadvantages occurring when a TDS value is "4"

FIG. 4 is a view illustrating disadvantages occurring when a value of a TDS is "4."

As shown in FIG. 4, a used frequency band is transmitted four times depending on a value of a TDS. Here, a first frequency band Band 1 transmitted at a first stage S1 is between 3168 MHz and 3595 MHz, and a second frequency band Band 2 transmitted at a second stage S2 is between 3596 MHz and 4221 MHz. Also, a third frequency band Band 3 transmitted at a third stage S3 is between 4224 MHz and 4752 MHz.

However, a first frequency band Band 1 is transmitted at a fourth stage S4 that is a last stage of the TDS. Thus, as shown in FIG. 4, a frequency band A 410 transmitted at a first stage S1 and a frequency band A 420 transmitted at a fourth stage S4 exist in the same band and have the same information as in a first frequency band Band 1. In other words, an overlapping phenomenon occurs. If a value of a TDS is increased to a multiple equal to or more than 4, frequency bands B in a second frequency band Band 2 shown in FIG. 4 exist at the same band and have the same information. In other words, an overlapping phenomenon occurs.

Figure 5:
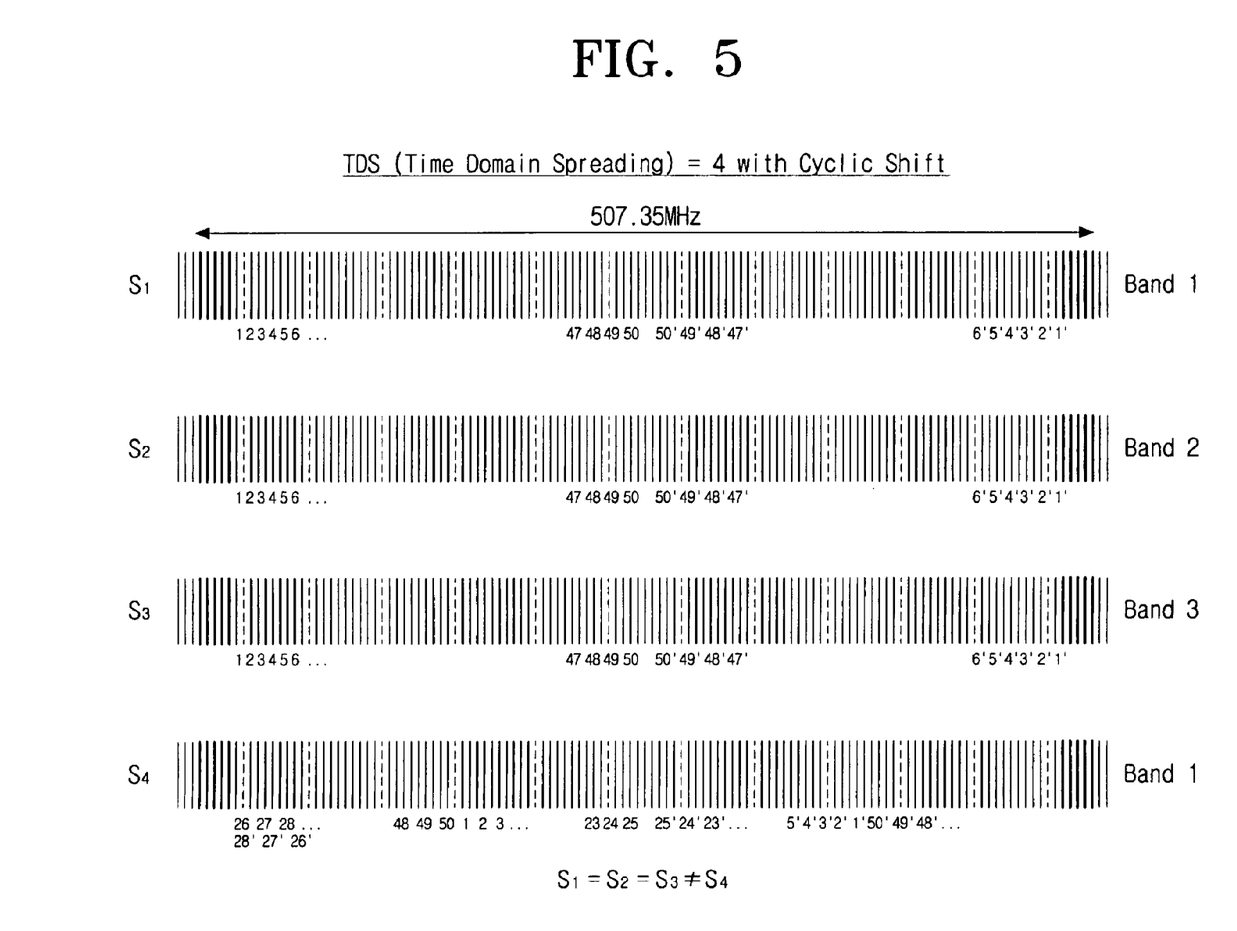
FIG. 5 is a view illustrating frequency bands of sub-carriers diverging according to a cyclic shift method when a TDS value is "4"

FIG. 5 is a view illustrating frequency bands of sub-carriers diverging according to a cyclic shift method when a value of a TDS is "4."

As shown in FIG. 5, to solve the disadvantages described with reference to FIG. 4, sub-carriers are cyclically shifted in units of 25 so as to diverge in a first frequency band Band 1 transmitted at a fourth stage S4, the first frequency band Band 1 having the same structure and the same information as a frequency band Band 1 transmitted at a first stage S1. In other words, as shown in FIG. 5, 25 sub-carriers from 26 to 50 are shifted to the positions of sub-carriers 1 to 25 so as to diverge in the first frequency band Band 1 transmitted at the fourth stage S4. Also, 25 sub-carriers from 25' to 1' are shifted to the positions of 25 sub-carriers 50' to 26' so as to diverge in a symmetric frequency band.

Thus, the first frequency band Band 1 transmitted at the first stage S1 has a different structure from the frequency band Band 1 transmitted at the fourth stage S4. The first, second, and third frequency bands Band 1, Band 2, and Band 3 respectively transmitted at the first, second, and third stages S1, S2, and S3 have the same structure and the same information.

Figure 6:
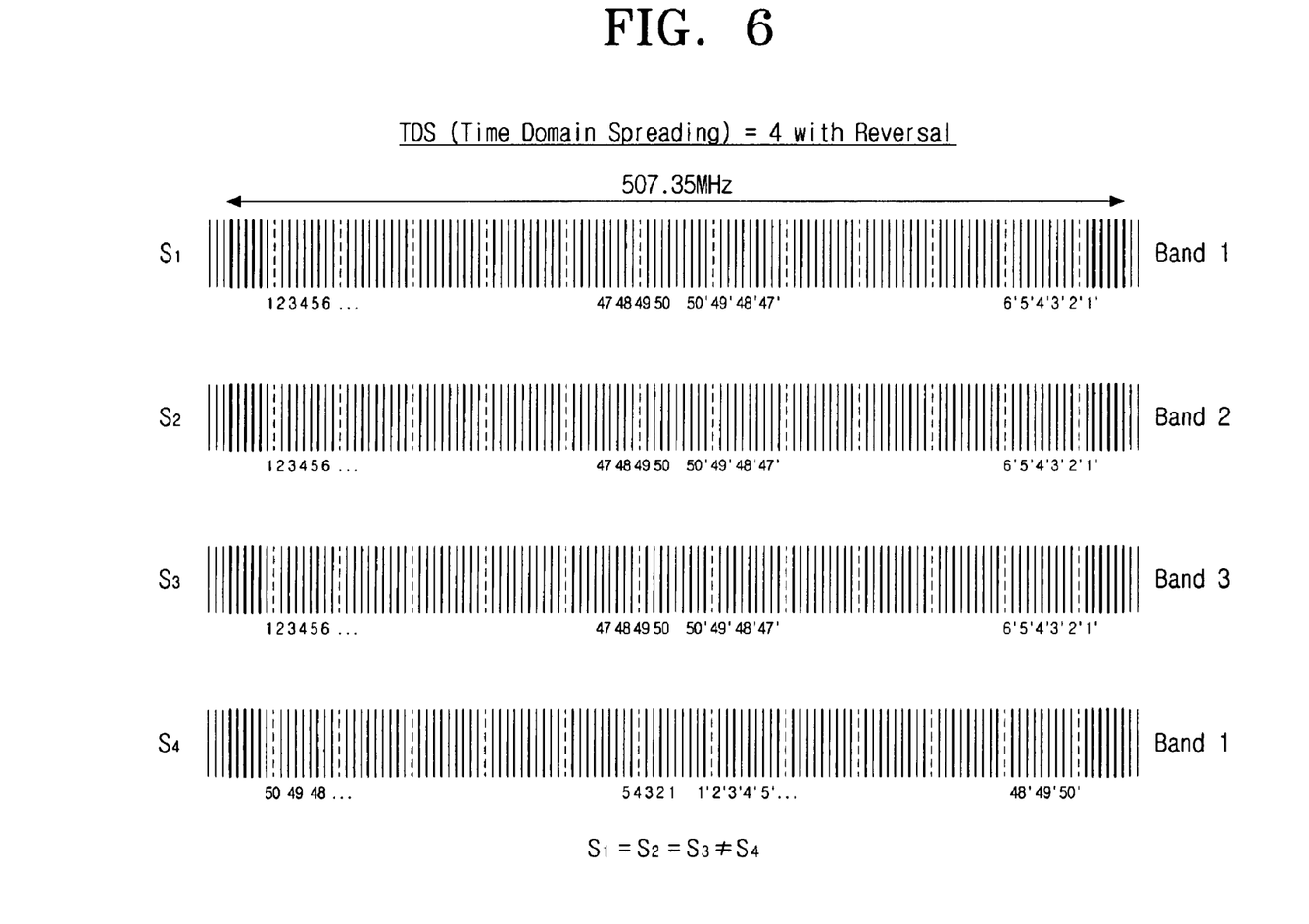
FIG. 6 is a view illustrating frequency bands of sub-carriers diverging according to a reversal method when a TDS value is "4"

FIG. 6 is a view illustrating frequency bands of sub-carriers diverging according to a reversal method when a value of a TDS is "4."

As shown in FIG. 6, to solve the disadvantages described with reference to FIG. 4, sub-carriers diverge in a reverse order in a unit of 50 in a first frequency band Band 1 of 507.35 MHz transmitted at a fourth stage S4, the first frequency band Band 1 having the same structure and the same information as a first frequency band Band 1 transmitted at a first stage S1. In other words, 50 sub-carriers from 50 to 1 diverge in the first frequency band Band 1 transmitted at the fourth stage S4 and 50 sub-carriers from 1' to 50' diverge in a symmetric frequency band according to a reversal method.

Thus, the first frequency band Band 1 transmitted at the first stage S1 has a different structure from the first frequency band Band 1 transmitted at the fourth stage S4. The first frequency band Band 1 at the first stage S1 and second and third frequency bands Band 2 and Band 3 transmitted at second and third stages S2 and S3 have the same structure and the same information.

Figure 7:
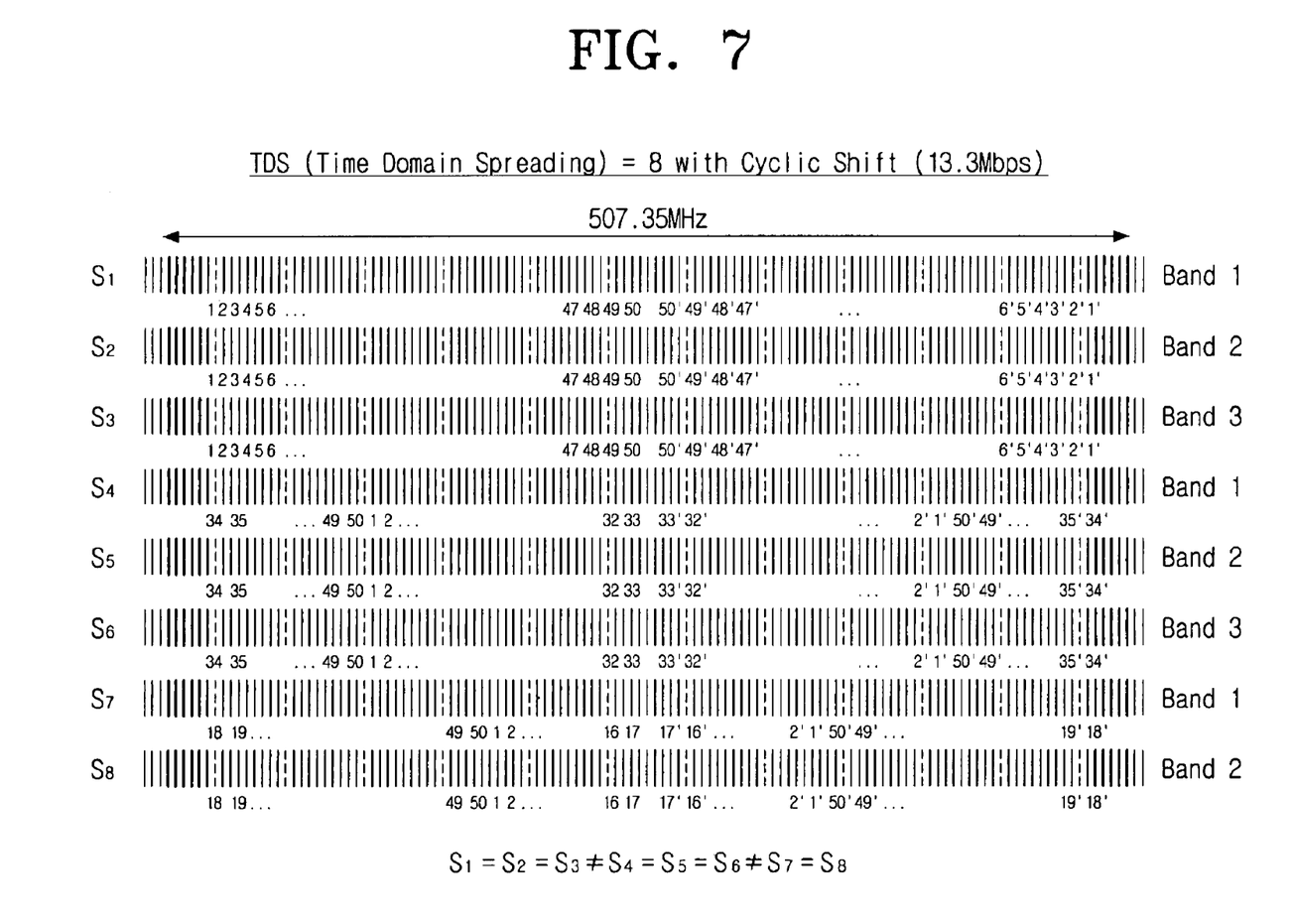
FIG. 7 is a view illustrating frequency bands of sub-carriers diverging according to a cyclic shift method when a TDS value is 2 or a multiple of 2.

FIG. 7 is a view illustrating frequency bands of sub-carriers diverging according to a cyclic shift method when a value of a TDS is 2 or a multiple of 2.

In a case where the value of the TDS is increased to 2 or a multiple of 2, such as 4, 6, or 8, disadvantages as described with reference to FIG. 4 occur. Thus, in the present embodiment, in a case where the value of the TDS is increased to 2 or a multiple of 2, sub-carriers diverge according to a cyclic shift method.

FIG. 7 shows a case where a value of a TDS is increased to a number multiple of 2, i.e., to 8. Here, each frequency band transmitted eight times is 507.35 MHz, and a transmission rate is 13.3 Mbps as shown in FIG. 7.

Referring to FIG. 7, a frequency band Band 1 including 50 sub-carriers and 50 symmetric sub-carriers is transmitted at a first stage S1, a second frequency band Band 2 having the same structure as the first frequency Band 1 is transmitted at a second stage S2, and a third frequency band Band 3 having the same structure as the first and second frequency bands Band 1 and Band 2 is transmitted at a third stage S3.

A first frequency band Band 1 is transmitted at a fourth stage S4, and is different from the first frequency band Band 1 transmitted at the first stage S1, since some sub-carriers are cyclically shifted so as to diverge from the first frequency band Band 1 transmitted at the fourth stage S4. In other words, 17 sub-carriers from positions 34 to 50 are shifted to the positions of sub-carrier 1 to 33 so as to diverge from the first frequency band Band 1 transmitted at the fourth stage S4. Also, 33 sub-carriers from positions 33' to 1' are shifted to the positions of sub-carriers 50' to 34' so as to diverge in a symmetric frequency band. Thus, the first frequency band Band 1 transmitted at the stage S4 has a different structure from the first frequency band Band 1 transmitted at the first stage S1.

A second frequency band Band 2 is transmitted at a fifth stage S5, and is different from the second frequency band Band 2 transmitted at the second stage S2, since some sub-carriers are cyclically shifted so as to diverge in the second frequency band Band 2 transmitted at the fifth stage S5. In other words, 17 sub-carriers from positions 34 to 50 are shifted to positions of 33 sub-carriers from 1 to 33 so as to diverge from the second frequency band Band 2 transmitted at the fifth stage S5. Also, 33 sub-carriers from 33' to 1' are shifted to the positions of 17 sub-carriers from 50' to 34' so as to diverge in a symmetric frequency. Thus, the second frequency band Band 2 transmitted at the fifth stage S5 has a different structure from the second frequency band Band 2 transmitted at the second stage S2.

A third frequency band Band 3 is transmitted at a sixth stage S6, and is different from the third frequency band transmitted at a third stage S3, since some sub-carriers are cyclically shifted so as to diverge in the third frequency band Band 3 transmitted at the sixth stage S6. In other words, 17 sub-carriers from 34 to 50 are shifted to previous positions of 33 sub-carriers from 1 to 33 so as to diverge from the third frequency band Band 3 transmitted at the third stage S6. Also, 33 sub-carriers from 33' to 1' are shifted to the positions of 17 sub-carriers from 50' to 34' so as to diverge in a symmetric frequency band. Thus, the third frequency band Band 3 transmitted at the sixth stage S6 has a different structure from the third frequency band Band 3 transmitted at the third stage S3.

A first frequency band Band 1 is transmitted at a seventh stage S7, and is different from the first frequency band Band 1 transmitted at a fourth stage S4, since some sub-carriers are cyclically shifted so as to diverge in the first frequency band Band 1 transmitted at the seventh stage S7. In other words, 33 sub-carriers from positions 18 to 50 are shifted to the positions of 17 sub-carriers 1 to 17 so as to diverge in the first frequency band Band 1 transmitted at the seventh stage S7. Also, 17 sub-carriers from 17' to 1' are shifted to the positions of 33 sub-carriers from 50' to 18' so as to diverge in a symmetric frequency band. Thus, the first frequency band Band 1 transmitted at the seventh stage S7 has a different structure from the first frequency band Band 1 transmitted at the first or fourth stage S1 or S4.

A second frequency band Band 2 is transmitted at an eighth stage S8 and is different from the second frequency band Band 2 transmitted at the second or fifth stage S2 or S5, since some sub-carriers are cyclically shifted so as to diverge from the second frequency band Band 2 transmitted at the eighth stage S8. In other words, 33 sub-carriers from 18 to 50 are shifted to the positions of 17 sub-carriers from 1 to 17 so as to diverge in the second frequency band Band 2 transmitted at the eighth stage S8. Also, 17 sub-carries from 17' to 1' are shifted to the positions of 33 sub-carriers from 50' to 18' so as to diverge in a symmetric frequency band. Thus, the second frequency band Band 2 transmitted at the eighth stage S8 has a different structure from the second frequency band Band 2 transmitted at the second or fifth stage S2 or S5.

Accordingly, sub-carriers in frequency bands transmitted at first, second, and third stages S1, S2, and S3 have the same structure. Sub-carriers in frequency bands transmitted at fourth, fifth, and sixth stages S4, S5, and S6 also have the same structure. Sub-carriers in frequency bands transmitted at the seventh and eighth stages S7 and S8 have the same structure.

However, the sub-carriers in the frequency bands transmitted at the first, second, and third stages S1, S2, and S3, the sub-carriers in the frequency bands transmitted at the fourth, fifth, and sixth stages S4, S5, and S6, and the sub-carriers in the frequency bands transmitted at the seventh and eighth stages S7 and S8 have different structures.

Figure 8:
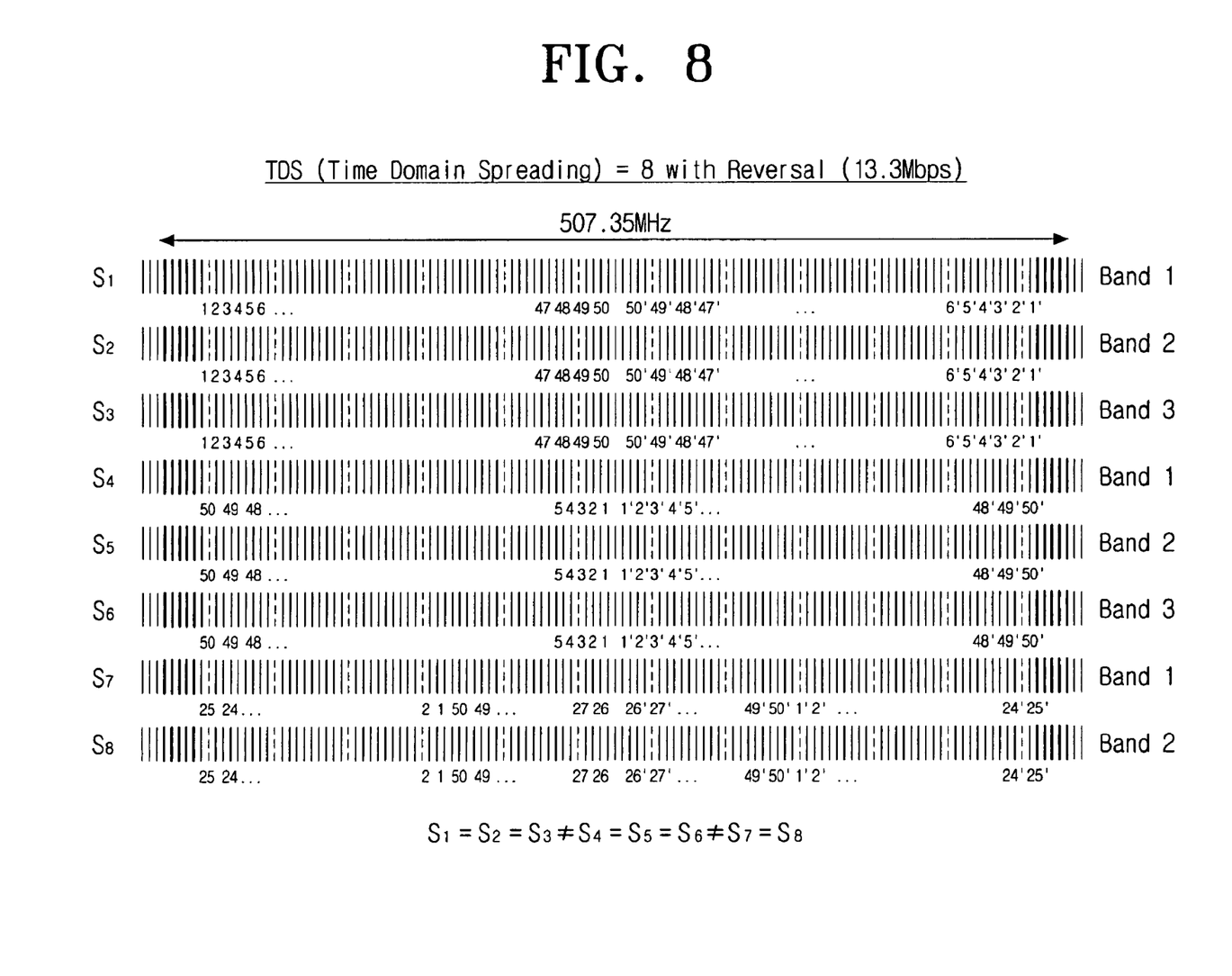
FIG. 8 is a view illustrating frequency bands of sub-carriers diverging according to a reversal method when a TDS value is 2 or a multiple of 2.

FIG. 8 is a view illustrating frequency bands of sub-carriers diverging according to a reversal method when a value of a TDS is a multiple of 2.

FIG. 8 illustrates a case where a value of a TDS is increased to a multiple of 2, i.e., to 8. Here, each of the frequency bands transmitted eighth times is 507.35 MHz, and a transmission rate is 13.3 Mbps.

As shown in FIG. 8, a first frequency band Band 1 including 50 sub-carriers and 50 symmetric sub-carriers is transmitted at a first stage S1, a second frequency band Band 2 having the same structure as the first frequency band Band 1 is transmitted at a second stage S2, and a third frequency band Band 3 having the same structure as the first and second frequency bands Band 1 and Band 2 is transmitted at a third stage S3.

A first frequency band Band 1 is transmitted at a fourth stage S4, and is different from the first frequency band Band 1 transmitted at the first stage S1, since the sub-carriers diverge in a reverse order from 50 to 1 from the first frequency band Band 1 transmitted at the fourth stage S4.

A second frequency band Band 2 is transmitted at a fifth stage S5, and is different from the second frequency band Band 2 transmitted at the second stage S2, since the sub-carriers diverge in a reverse order from 50 to 1 from the second frequency band Band 2 transmitted at the fifth stage S5.

A third frequency band Band 3 is transmitted at a sixth stage S6, and is different from the third frequency band Band 3 transmitted at the third stage S3, since the sub-carriers diverge in a reverse order from 50 to 1 from the third frequency band Band 3 transmitted in the sixth stage S6.

A first frequency band Band 1 is transmitted at a seventh stage S7, and is different from the first frequency band Band 1 transmitted at the first or fourth stage S1 or S4, since some sub-carriers diverge in a reverse order from the first frequency band Band 1 transmitted at the seventh stage S7. In other words, sub-carriers in a reverse order from 25 to 1 and sub-carriers in a reverse order from 50 to 26 diverge in the first frequency band Band 1 transmitted at the seventh stage S7. Also, sub-carriers in a reverse order from 26' to 50' and sub-carriers in a reverse order from 1' to 25' diverge in a symmetric frequency band. Thus, the first frequency band Band 1 transmitted at the seventh stage S7 has a different structure from the first frequency band Band 1 transmitted at the first or fourth stage S1 or S4.

A second frequency band Band 2 is transmitted at an eighth stage S8, and is different from the second frequency band Band 2 transmitted at the second or fifth stage S2 or S5, since the sub-carriers in a reverse order from 25 to 1 and sub-carriers in a reverse order from 50 to 26 diverge from the second frequency band Band 2 transmitted at the eighth stage S8. Also, sub-carriers in a reverse order from 26' to 50' and sub-carriers in a reverse order from 1' to 25' diverge in a symmetric frequency band. Thus, the second frequency band Band 2 transmitted at the eighth stage S8 has a different structure from the second frequency band Band 2 transmitted at the second or fifth stage S2 or S5.

Accordingly, sub-carriers in frequency bands transmitted at first, second, and third stages S1, S2, and S3 have the same structure. Sub-carriers in frequency bands transmitted at fourth, fifth, and sixth stages S4, S5, and S6 also have the same structure. Sub-carriers in frequency bands transmitted at seventh and eighth stages S7 and S8 have the same structure.

However, the sub-carriers in the frequency bands transmitted at the first, second, and third stages S1, S2, and S3, the sub-carriers in the frequency bands transmitted at the fourth, fifth, and sixth stages S4, S5, and S6, and the sub-carriers in the frequency bands transmitted at the seventh and eighth stages S7 and S8 have different structures.

As described above, according to an embodiment of the present invention, a frequency band in which sub-carriers diverge can be transmitted a plurality of times during the transmission of an MB-OFDM symbol. Thus, stable frequency links can be secured. Also, a BER can be reduced.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A sub-carrier diversity method on an MB-OFDM (multi-band orthogonal-frequency-division-multiplexing) system repeatedly transmitting an identical frequency band of an identical symbol, the method comprising:

setting a value of a TDS (time domain spreading) of sub-carriers depending on a transmission rate;

in response to the value of the TDS being a multiple of two, cyclically shifting positions of the sub-carriers by a first predetermined unit at a first through a third stage and shifting positions of the sub-carriers by a second predetermined unit at a fourth through a sixth stage, so that the sub-carriers diverge in frequency bands, wherein the first predetermined unit is a different value than the second predetermined unit; and transmitting the frequency bands in stages such that after every third stage a cycle begins and the frequency band is shifted to a different frequency band to prevent transmitted frequency bands from overlapping, the frequency band of the fourth through the sixth stage is different from the frequency band of the first through third stages, and the first through third stages each have the same frequency band.

2. The sub-carrier diversity method of claim 1, wherein if the value of the TDS is set to 2 or a multiple of 2 which is equal to or greater than a multiple of 4, the sub-carriers are cyclically shifted in the first predetermined unit and the second predetermined unit in the frequency band transmitted at each stage so as to diverge.

3. The sub-carrier diversity method of claim 1, wherein if the value of the TDS is 4, the first predetermined unit is 50 and the second predetermined unit is 25.

4. The sub-carrier diversity method of claim 3, wherein 25 sub-carriers from 26 to 50 are shifted to positions of 25 sub-carriers from 1 to 25 so as to diverge in the frequency band transmitted at the fourth stage S4, and 25 sub-carriers from 25' to 1' are shifted to positions of 25 sub-carriers from 50' to 26' so as to diverge in a symmetric frequency band.

5. The sub-carrier diversity method of claim 1, wherein if the value of the TDS is 3, 50 sub-carriers and 50 symmetric sub-carriers diverge in the frequency band transmitted at each stage.

6. The sub-carrier diversity method of claim 2, wherein if the value of the TDS is 8, 50 sub-carriers and 50 symmetric sub-carriers diverge in frequency bands transmitted at first through third stages, 17 sub-carriers from positions 34 to 50 are shifted to the positions of 33 sub-carriers from 1 to 33 so as to diverge in frequency bands transmitted at fourth through sixth stages, 33 sub-carriers from 33' to 1' are shifted to the positions of 17 sub-carriers from 50' to 34' so as to diverge in symmetric frequency bands, 33 sub-carriers from 18 to 50 are shifted to the positions of 17 sub-carriers from 1 to 17 so as to diverge in frequency bands transmitted at seventh and eighth stages, and 17 sub-carriers from 17' to 1' are shifted to the positions of 33 sub-carriers from 50' to 18' so as to diverge in symmetric frequency bands.

7. The sub-carrier diversity method of claim 2, wherein if the value of the TDS is 8, 50 sub-carriers and 50 symmetric sub-carriers diverge in frequency bands at first through third stages, sub-carriers in a reverse order from 50 to 1 diverge in frequency bands transmitted at fourth through sixth stages and sub-carriers in a reverse order from 1' to 50' diverge in symmetric frequency bands, sub-carriers in a reverse order from 25 to 1 and sub-carriers in a reverse order from 50 to 26 diverge in frequency bands transmitted at seventh and eighth stages, and sub-carriers in a reverse order from 26' to 50' and sub-carriers in a reverse order from 1' to 25' diverge in symmetric frequency bands.

8. A sub-carrier diversity method on an MB-OFDM (multi-band orthogonal-frequency-division-multiplexing) system repeatedly transmitting an identical frequency band of an identical symbol, the method comprising:
  setting a value of a TDS (time domain spreading) of sub-carriers to a multiple of two depending on a transmission rate;
  in response to the value of the TDS being a multiple of two, cyclically shifting positions of the sub-carriers by a first predetermined unit at a first through a third stage and shifting positions of the sub-carriers by a second predetermined unit at a fourth through a sixth stage, within each TDS, so that the sub-carriers transmitted at different stages diverge into frequency bands, wherein the first predetermined unit is a different value than the second predetermined unit; and
  transmitting the frequency bands in stages such that after every third stage a cycle begins and the frequency band is shifted to a different frequency band to prevent transmitted frequency bands from overlapping, the frequency band of the fourth through the sixth stage is different from the frequency band of the first through third stages, and the first through third stages each have the same frequency band.

9. The sub-carrier diversity method of claim 8, wherein if the value of the TDS is 4, the sub-carriers in the frequency bands transmitted at the first, second, and third stages have different structures from the sub-carriers in the frequency bands transmitted at the fourth, fifth and sixth stages.

10. The sub-carrier diversity method of claim 9, wherein if the value of the TDS is 4, the sub-carriers in the frequency bands transmitted at the seventh and eighth stages have different structures from the sub-carriers in the frequency bands transmitted in the first, second, third, fourth, fifth, and sixth stages.

11. A sub-carrier diversity method on an MB-OFDM (multi-band orthogonal-frequency-division-multiplexing) system, the method comprising:
  setting a value of a TDS (time domain spreading) of sub-carriers according to a frequency hopping pattern;
  in response to the value of the TDS being a multiple of two, cyclically shifting positions of the sub-carriers by a first predetermined unit at a first through a third stage and shifting positions of the sub-carriers by a second predetermined unit at a fourth through a sixth stage, within each TDS, so that the sub-carriers transmitted at different stages diverge in frequency bands from each other in the MB-OFMD system in which an identical frequency band of an identical symbol is repeated, wherein the first predetermined unit is a different value than the second predetermined unit; and
  transmitting the frequency bands in stages such that after every third stage a cycle begins and the frequency band is shifted to a different frequency band to prevent transmitted frequency bands from overlapping, the frequency band of the fourth through the sixth stage is different from the frequency band of the first through third stages, and the first through third stages each have the same frequency band.

12. The sub-carrier diversity method of claim 9, wherein the sub-carriers are cyclically shifted in the first predetermined unit and the second predetermined unit so that different frequency bands diverge from each other.

* * * * *